(12) United States Patent
Yi

(10) Patent No.: US 8,286,078 B2
(45) Date of Patent: Oct. 9, 2012

(54) APPARATUS AND METHOD FOR EFFICIENTLY DISPLAYING WEB CONTENTS

(75) Inventor: Jung-Bae Yi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 314 days.

(21) Appl. No.: 12/608,531

(22) Filed: Oct. 29, 2009

(65) Prior Publication Data

US 2010/0115398 A1    May 6, 2010

(30) Foreign Application Priority Data

Oct. 31, 2008 (KR) ........................ 10-2008-0107581

(51) Int. Cl.
*G06F 17/00* (2006.01)

(52) U.S. Cl. ........................................ 715/273; 715/864

(58) Field of Classification Search .................. 715/273, 715/277, 864, 200
See application file for complete search history.

(56) References Cited

U.S. PATENT DOCUMENTS

| | | | | |
|---|---|---|---|---|
| 5,889,527 | A * | 3/1999 | Tsai | 345/629 |
| 6,587,118 | B1 * | 7/2003 | Yoneda | 345/629 |
| 7,127,673 | B2 * | 10/2006 | Iwata et al. | 715/209 |
| 7,509,575 | B2 * | 3/2009 | Makela | 715/238 |
| 7,889,184 | B2 * | 2/2011 | Blumenberg et al. | 345/173 |
| 7,889,185 | B2 * | 2/2011 | Blumenberg et al. | 345/173 |
| 8,132,100 | B2 * | 3/2012 | Seo et al. | 715/706 |
| 2003/0095135 | A1 * | 5/2003 | Kaasila et al. | 345/613 |
| 2004/0204128 | A1 * | 10/2004 | Zakharia et al. | 455/566 |
| 2005/0257142 | A1 * | 11/2005 | Lai et al. | 715/523 |
| 2006/0036940 | A1 * | 2/2006 | Hsiu-Ping et al. | 715/513 |
| 2006/0048051 | A1 * | 3/2006 | Lazaridis | 715/517 |
| 2006/0184875 | A1 * | 8/2006 | Okada et al. | 715/516 |
| 2007/0150829 | A1 * | 6/2007 | Eschbach et al. | 715/781 |
| 2008/0005668 | A1 * | 1/2008 | Mavinkurve et al. | 715/526 |
| 2008/0168388 | A1 * | 7/2008 | Decker | 715/800 |
| 2008/0201666 | A1 * | 8/2008 | Park et al. | 715/853 |
| 2009/0125802 | A1 * | 5/2009 | Chen et al. | 715/234 |
| 2009/0164887 | A1 * | 6/2009 | Ikegami | 715/247 |
| 2009/0281724 | A1 * | 11/2009 | Blumenberg et al. | 701/208 |
| 2009/0303254 | A1 * | 12/2009 | Broms | 345/660 |
| 2010/0186040 | A1 * | 7/2010 | Ito et al. | 725/44 |
| 2011/0107197 | A1 * | 5/2011 | DeLuca et al. | 715/234 |

(Continued)

FOREIGN PATENT DOCUMENTS

KR    1020080032391    4/2008

OTHER PUBLICATIONS

Karstens et al., Visiual Interfaces for Mobile Handhelds, Google 2003, pp. 1-5.*

(Continued)

*Primary Examiner* — Cong-Lac Huynh

(74) *Attorney, Agent, or Firm* — The Farrell Law Firm, P.C.

(57) ABSTRACT

A method for displaying web content on a mobile communication terminal is provided. When a touch input is received from a user for web content displayed on the mobile communication terminal having a touch screen, a process for selecting an area to be enlarged at a position where the touch input is generated and overlapping, enlarging, and displaying the selected area on the entire screen is performed. When the selected area is enlarged, rendering performance can be improved and a dynamic view can be provided to the user.

19 Claims, 7 Drawing Sheets

U.S. PATENT DOCUMENTS

2011/0134066 A1* 6/2011 Blumenberg et al. ......... 345/173
2011/0249032 A1* 10/2011 Bells et al. .................... 345/660

OTHER PUBLICATIONS

Churchill et al., Learning Object Design Considerations for Small-screen Handheld Devices, Google 2006, pp. 881-893.*

Cheng et al., Video Adaptation for Small Display based on Content Recomposition, IEEE 2007, pp. 43-58.*

Yang et al., A Context-driven Content Adaptation Planner for Improving Mobile Internet Accessibility, IEEE Sep. 2008, pp. 88-95.*

Zhang, Web Content Adaptation for Mobile Handheld Devices, ACM 2007, pp. 75-79.*

* cited by examiner

APPARATUS AND METHOD FOR EFFICIENTLY DISPLAYING WEB CONTENTS

PRIORITY

This application claims priority under 35 U.S.C. §119(a) to a Korean Patent Application filed in the Korean Intellectual Property Office on Oct. 31, 2008 and assigned Serial No. 10-2008-0107581, the disclosure of which is incorporated herein by reference.

BACKGROUND OF THE INVENTION

1. Field of the Invention The present invention relates generally to an apparatus and method for displaying web content, and in particular, to an apparatus and method for efficiently displaying web content on a mobile communication terminal having a limited screen size.

2. Description of the Related Art

In order for users to smoothly display web content on mobile communication terminals such as a Personal Digital Assistant (PDA) and a mobile phone, a screen size is small, for example, 320×240 pixels or 480×320 pixels, due to portability. To solve this problem, a zoom-in/out function is added to enlarge/reduce a specific area to be displayed.

However, even though the above-described zoom-in/out function is provided, it is not easy to select a desired portion, for example, a hyperlink element, using a finger on a touch-screen type mobile communication terminal. A portion around the finger on a screen may be covered with the finger.

Even though a zoom-in method for enlarging a specific area is used, it is difficult For the mobile communication terminal to determine a current position where the specific area is enlarged from the entire screen when the specific area is enlarged. Accordingly, since the mobile communication terminal displays only an enlarged area of the web content as the entire screen, a user may view only part of the web content and be inconvenienced in that he/she must return to a previous screen to select other content. That is, the user may view the previous screen when the screen is zoomed out a number of zoom-in times. There is inconvenience in use since the number and length of operations required for zoom-in/out are greater than those required for selecting content itself during web navigation.

As described above, the conventional zoom-in/out method has a problem in that it is difficult to use web content to be displayed as the number of links included in the web contents increases when a specific portion of the web contents is selected. Since it is difficult to separately extract and process only the specific portion of the web content, a need exists for a method for efficiently displaying web content on a mobile communication terminal.

SUMMARY OF THE INVENTION

An aspect of the present invention is to address at least the problems and/or disadvantages set forth above and to provide at least the advantages described below. Accordingly, one aspect of the present invention is to provide an apparatus and method for efficiently displaying web content on a mobile communication terminal so that a user may easily select and view a specific area of the web content while web browsing.

Another aspect of the present invention is to provide an apparatus and method for efficiently displaying web content so that a user may simultaneously view an enlarged area along with the entire screen on a mobile communication terminal having a touch screen.

According to one aspect of the present invention, there is provided a method for efficiently displaying web content on a mobile communication terminal having a touch screen, including determining whether a touch input on a web content screen is received from a user; selecting an area to be enlarged at a position where the touch input is generated; determining an enlargement scheme for the selected area; and enlarging and displaying the selected area at a predefined ratio by overlapping the selected area on the web content screen on the basis of the determined scheme.

According to another aspect of of the present invention, there is provided a mobile communication terminal having a touch screen for efficiently displaying web content, including a mobile browser engine for controlling an operation for selecting an area to be enlarged at a position where a touch input is generated when the touch input on a web content screen is received from a user, determining an enlargement scheme for the selected area, and enlarging and displaying the selected area at a predefined ratio by overlapping the selected area on the web content screen on the basis of the determined scheme; and a display for enlarging and displaying the selected area.

BRIEF DESCRIPTION OF THE DRAWINGS

The above and other aspects, features and advantages of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

The present invention provides a method for efficiently displaying web contents on a mobile communication terminal. When a touch input is received from a user for interacting with web content displayed on the mobile communication terminal having a touch screen, a process for selecting an area to be enlarged at a position where the touch input is generated, and overlapping, enlarging and displaying the selected area on the entire screen is performed. When the selected area is enlarged, rendering performance can be improved and a dynamic view can be provided to the user.

Figure 1:
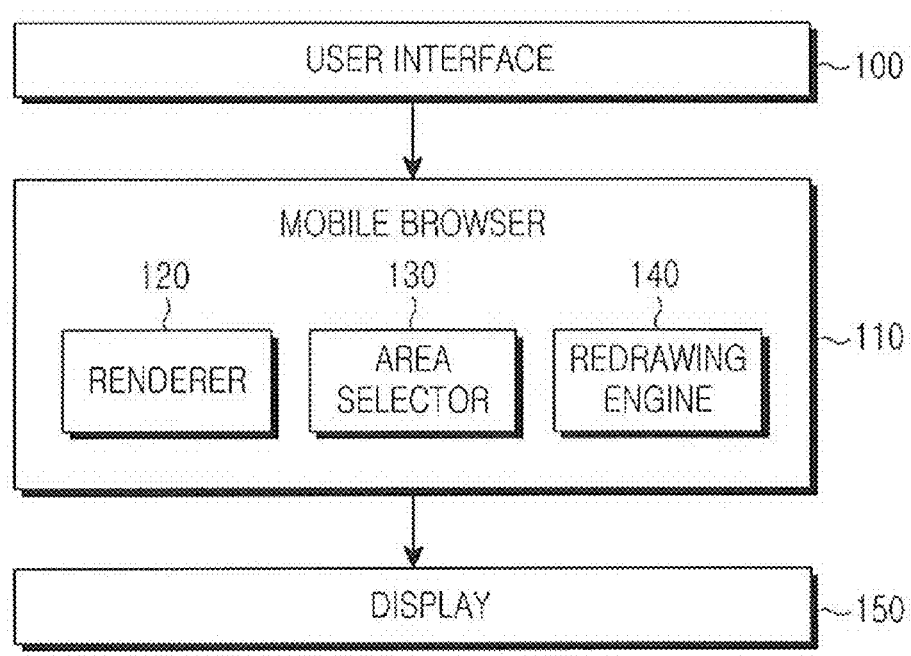
FIG. 1 is a block diagram of a mobile communication terminal according to an embodiment of the present invention.

Elements and their operations of the mobile communication terminal having the touch screen in which the above-described function is implemented will be described with reference to FIG. 1. FIG. 1 is a block diagram of a mobile communication terminal according to an embodiment of the present invention.

Referring to FIG. 1, the mobile communication terminal includes a user interface 100, a mobile browser 110, and a display 150. Since only elements required for explaining the present invention are illustrated in FIG. 1, a description of other elements is omitted. The present invention can be applied to various mobile communication terminals such as a PDA, a mobile phone, etc. In particular, an example of a mobile communication terminal having a touch screen will be described.

User interface 100 is a user input means serving as an interface for an arrangement of various buttons, and for a service portion. Specifically, when the user interface 100 is configured in the form of a touch screen, control signals for navigating through web content and selecting a specific area are delivered from the user to the mobile browser 110 using a key input unit.

The mobile browser 110 has an engine structure, which internally includes a renderer 120, an area selector 130, and a redrawing engine 140.

The renderer 120 renders data expressed in the format of HTML. For example, the renderer 120 performs a function for properly processing web content to be displayed on the basis of a screen size.

The area selector 130 selects an area to be enlarged at a position where a touch input is received from the user when a zoom-in request for a specific area of web content is made. Specifically, web content configured in a tag unit of an image and text are displayed on the entire screen of the mobile communication terminal according to an embodiment of the present invention. The web content screen is divided into one or more areas. Images and/or text are arranged according to each area. This arrangement follows an HTML format of a tag unit. When the touch input is made on the web content screen, the area selector 130 selects an area including a position where the touch input is generated or an area closest to the position. Accordingly, the area selector 130 selects start and end areas corresponding to a closest tag unit on an HTML document. The tag unit having the start and end areas is defined as a selected area.

The redrawing engine 140 performs a redrawing operation on the selected area. In other words, the redrawing engine 140 generates a screen so that the selected area is three-dimensionally enlarged and displayed in a state in which the entire screen is displayed. In this case, the redrawing engine 140 first determines an enlargement scheme when the selected area is enlarged and displayed. The redrawing engine 140 determines whether active context exists within the selected area so as to determine the enlargement scheme. According to the presence of active context within the selected area, the redrawing engine 140 first determines whether to re-create an HTML document for the selected area or to generate a snapshot image for the selected area.

Now, the active context will be described in detail. The active context indicates an item such as, for example, the movement to a linked web page or a button click, through which the user's interactions is possible. An example of an active context tag list for inducing the user's interaction is shown in Table 1. Table 1 is only one example of the tag list and the present invention is not limited thereto.

TABLE 1

| Tag | Description |
| --- | --- |
| <a> | Defines an anchor |
| <button> | Defines a push button |
| <link> | Defines a resource reference |
| <input> | Defines an input field |
| <textarea> | Defines a text area |
| <select> | Defines a selectable list |
| <optgroup> | Defines an option group |
| <option> | Defines an item in a list box |
| <label> | Defines a label for a form control |
| <fieldset> | Defines a fieldset |
| <legend> | Defines a title in a fieldset |
| <isindex> | Deprecated. Defines a single-line input field |

Table 1 illustrates a tag list as a criterion required for determining whether active context exists. Specifically, the redrawing engine 140 determines whether active context, that is, a tag corresponding to the tag list of Table 1, is included in an HTML document for a selected area. When the active context is included, the redrawing engine 140 creates the HTML document for the selected area. For example, when a link is included in the selected area, a screen must be generated so that the user can move to a linked web page by clicking the link even in an enlarged area. For this, the redrawing engine 140 re-creates the HTML document for the selected area. Since the user's interaction does not need to be induced when no active context is included, a snapshot image for the selected area is generated.

The redrawing engine 140 renders an HTML document or snapshot image on a new window layer after setting the entire screen to a background and generating the new window layer thereon. At this time, an enlargement ratio as a size of the selected area to be enlarged and displayed on the entire screen can be pre-adjusted.

A layer structure of a web content screen on the mobile communication terminal according to an embodiment of the present invention will be described with reference to FIG. 2.

Figure 2:
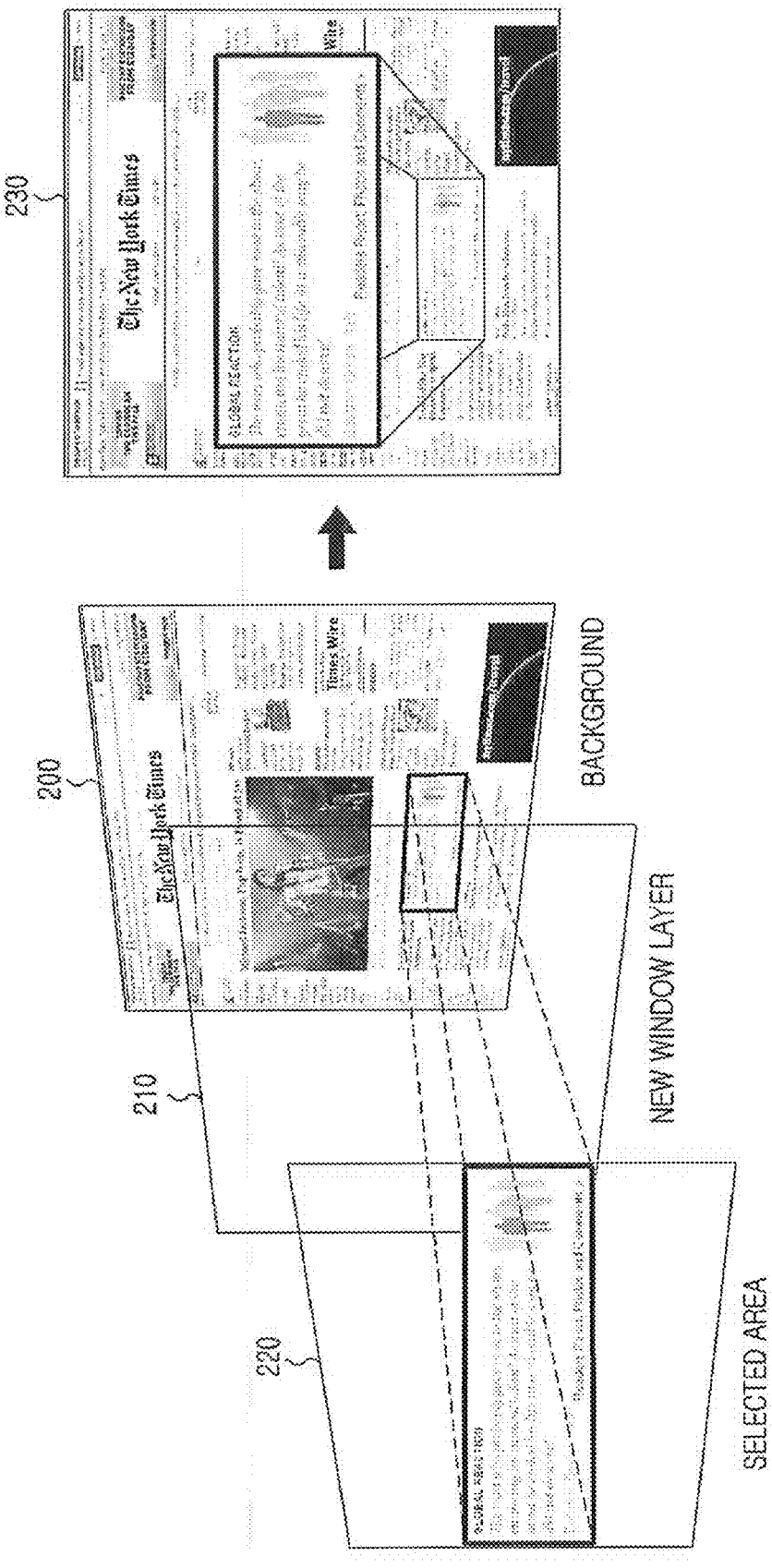
FIG. 2 is a diagram of a layer structure of a web content screen in the mobile communication terminal according to an embodiment of the present invention.

As illustrated in FIG. 2, the web content screen on the mobile communication terminal according to the present invention has a layer structure including a background layer 200 for providing a background having an image area and a text area and a new window layer 210 for enlarging and displaying an area selected by touching a touch screen corresponding to each area of the background layer 200. In this case, a selected area 220 is basically overlapped and provided so that a background provided from the background layer 200 can be visually identified.

An operation for enlarging and displaying the selected area by touching the touch screen has been described, but an area to be enlarged may be selected by a direction key. For example, the web content screen is pre-divided into a plurality of areas according to an image and text. The user can select a desired area by changing a color of a boundary of a corresponding area or shading the corresponding area using an indicator for movement between the areas. In this case, the user moves to the desired area by moving the indicator. When a key for selecting the desired area at a position where the indicator is placed is input, the mobile communication terminal performs an operation for enlarging and displaying the area. In the layer structure as illustrated in FIG. 2, the web content screen may further include a layer for providing the indicator for indicating the movement between the areas.

As indicated by reference numeral 230, the display 150 displays the enlarged selected area overlapped on the entire screen. The display 150 can be a display such as a Liquid Crystal Display (LCD), which performs a function for displaying data rendered by the redrawing engine 140. Other display devices are contemplated.

A spatial sense of the screen is increased by enlarging a specific area selected by the user from the entire screen as described above, so that the user can receive a three-dimensional dynamic view. The user can use web navigation in a three-dimensional space, not two-dimensional web surfing, by providing an afterimage effect as if the selected area moves ahead or behind when the selected area is enlarged or returned to an original position on the two-dimensional screen.

Figure 3:
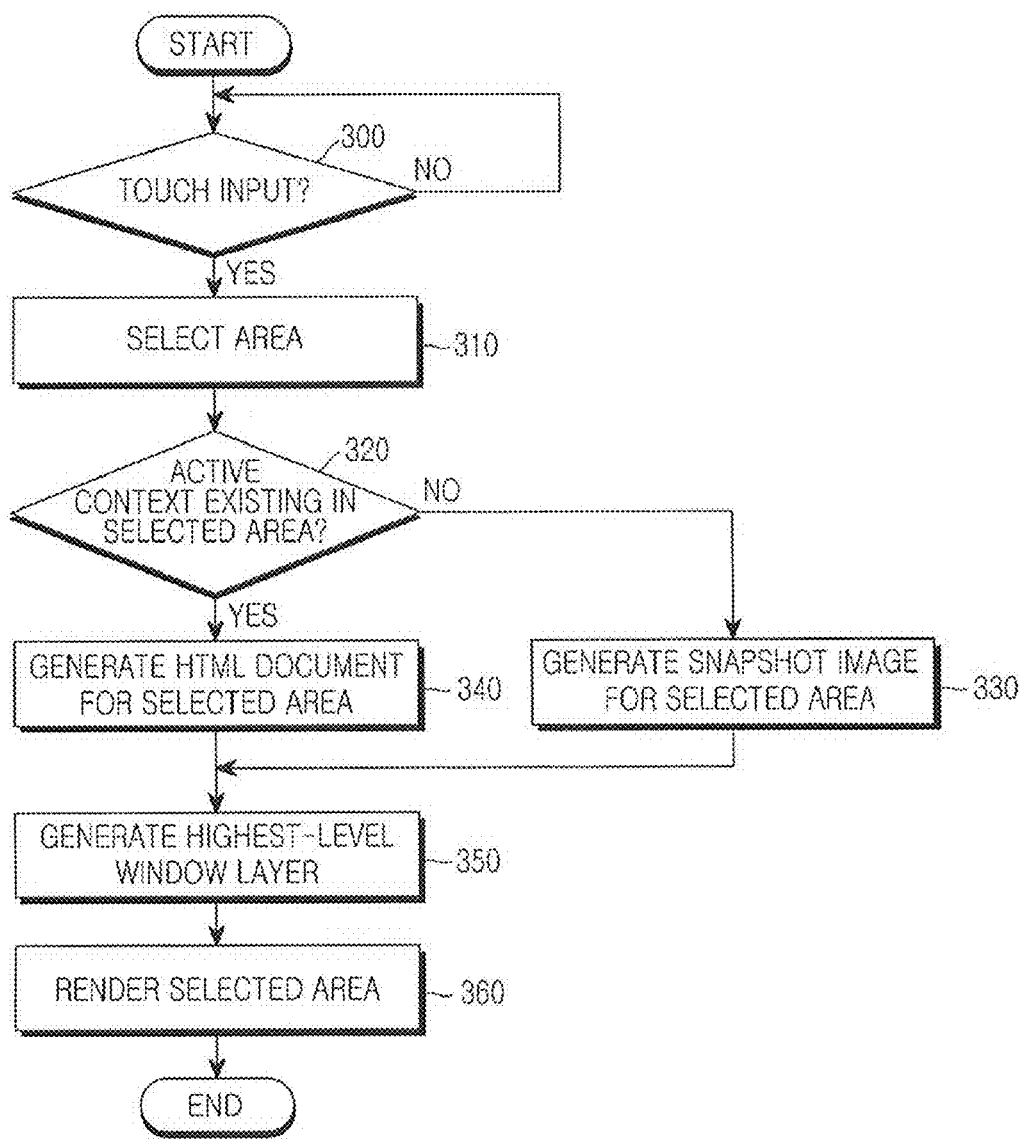
FIG. 3 is a flowchart of an operation in the mobile communication terminal for displaying web contents according to an embodiment of the present invention.

The operation of the mobile communication terminal having the above-described structure will be described with reference to FIG. 3. FIG. 3 is a flowchart of an operation in the mobile communication terminal for displaying web contents according to an embodiment of the present invention. Hereinafter, the operation will be described with reference to FIGS. 3, 4A, 4B, 4C, 5A, 5B and 5C, but a method for enlarging and displaying a selected area according to an embodiment of the present invention is not limited thereto.

Figure 4A:
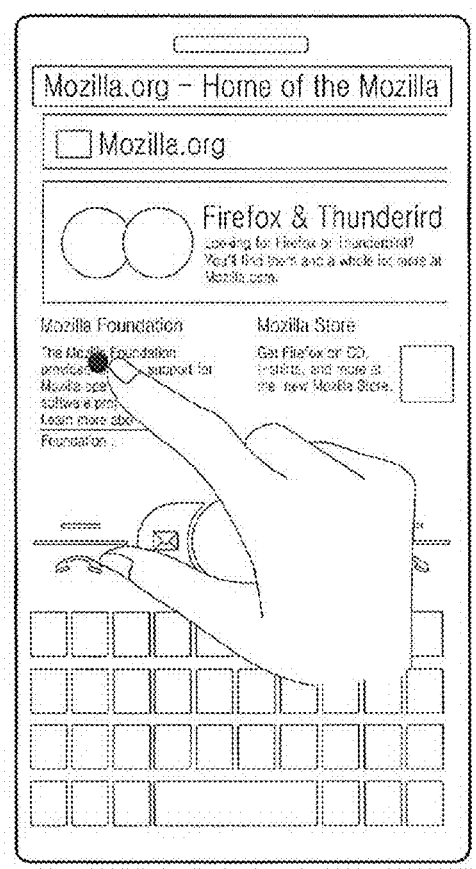
FIGS. 4A to 4C illustrate a process for re-creating an Hypertext Markup Language (HTML) document for a selected area according to an embodiment of the present invention.
Figure 4B:
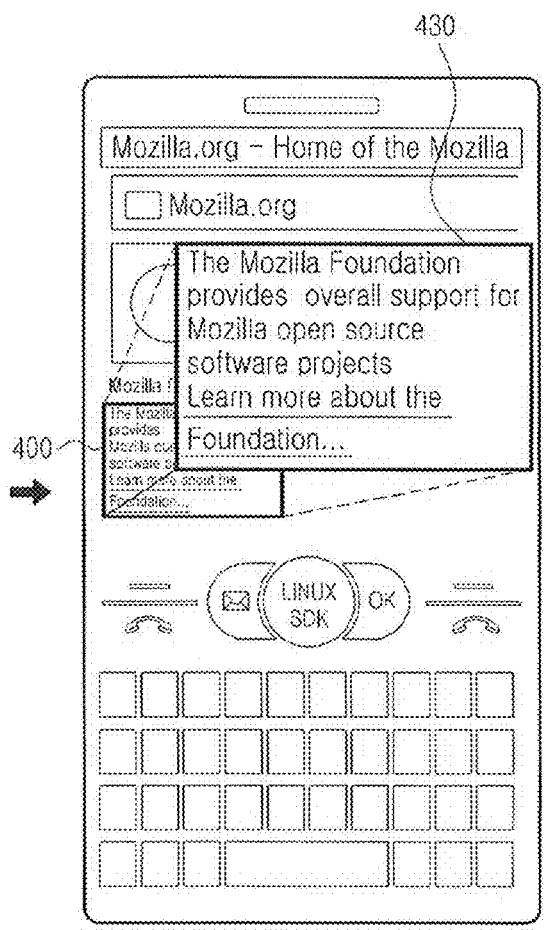
Figure 4C:
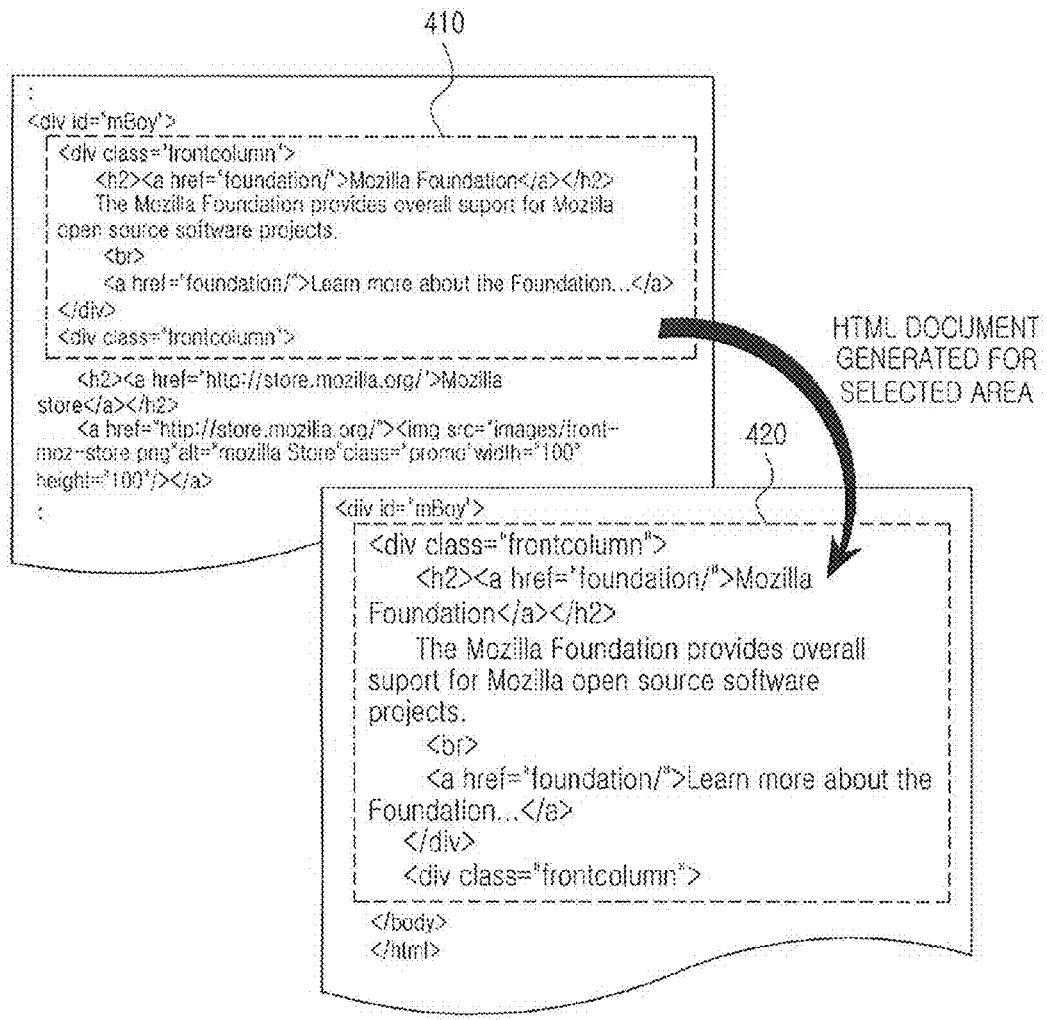

Referring to FIG. 3, the mobile communication terminal determines whether there is a touch input from the user in step 300. When there is the touch input, an area is selected on the basis of a position where the touch input is generated in step 310. For example, when the user touches a specific area on a web content screen as illustrated in FIG. 4A, the mobile communication terminal determines a tag unit closest to the position where the touch input is generated. Accordingly, the selected area can be determined as indicated by reference numeral 400 of FIG. 4B. Here, an HTML source for the web content screen of FIG. 4A is illustrated in FIG. 4C. In particular, a tag unit having start and end areas corresponding to the area 400 selected by the user is indicated by reference numeral 410 of FIG. 4C.

When the selected area is determined, the mobile communication terminal determines whether active context exists in the selected area in step 320. In other words, it is determined whether a tag through which the user's interaction is possible in the tag list as shown in Table 1 exists in the tag 410 corresponding to the selected area. When the active context exists, the mobile communication terminal proceeds to step 340 to generate an HTML document for the selected area. For example, when a link capable of being clicked by the user as the active context is included in the selected area, a link click of the user must be possible even in an enlarged area. Accordingly, an HTML document is re-created with the tag 410 corresponding to the selected area as illustrated in FIG. 4C. In particular, a portion of the HTML document for the selected area is indicated by reference numeral 420 of FIG. 4C.

Figure 5A:
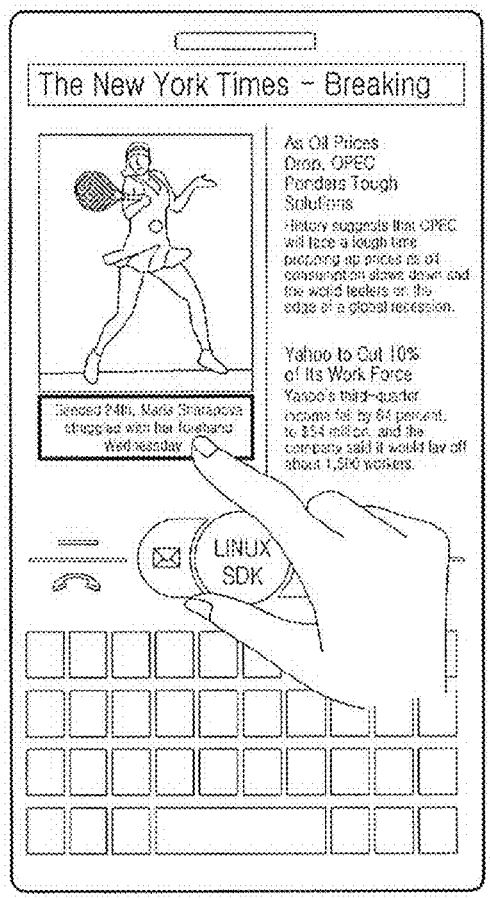
FIGS. 5A to 5C illustrate screens based on the selected area according to an embodiment of the present invention.
Figure 5B:
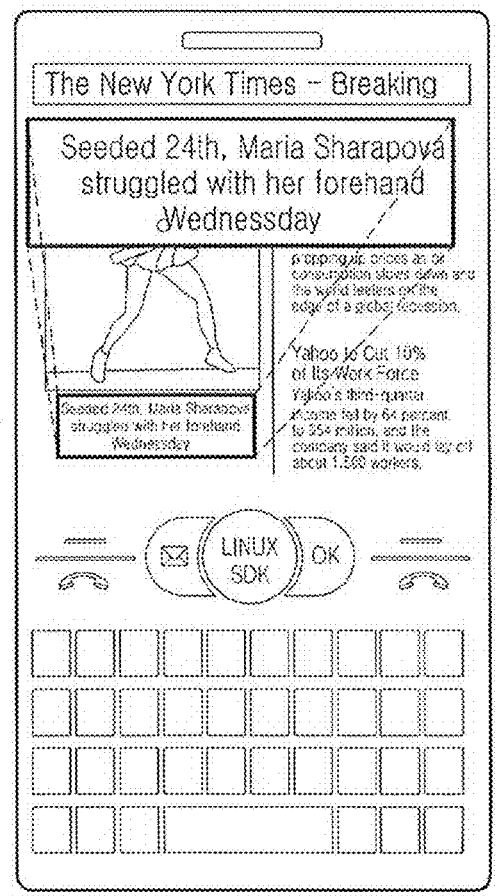
Figure 5C:
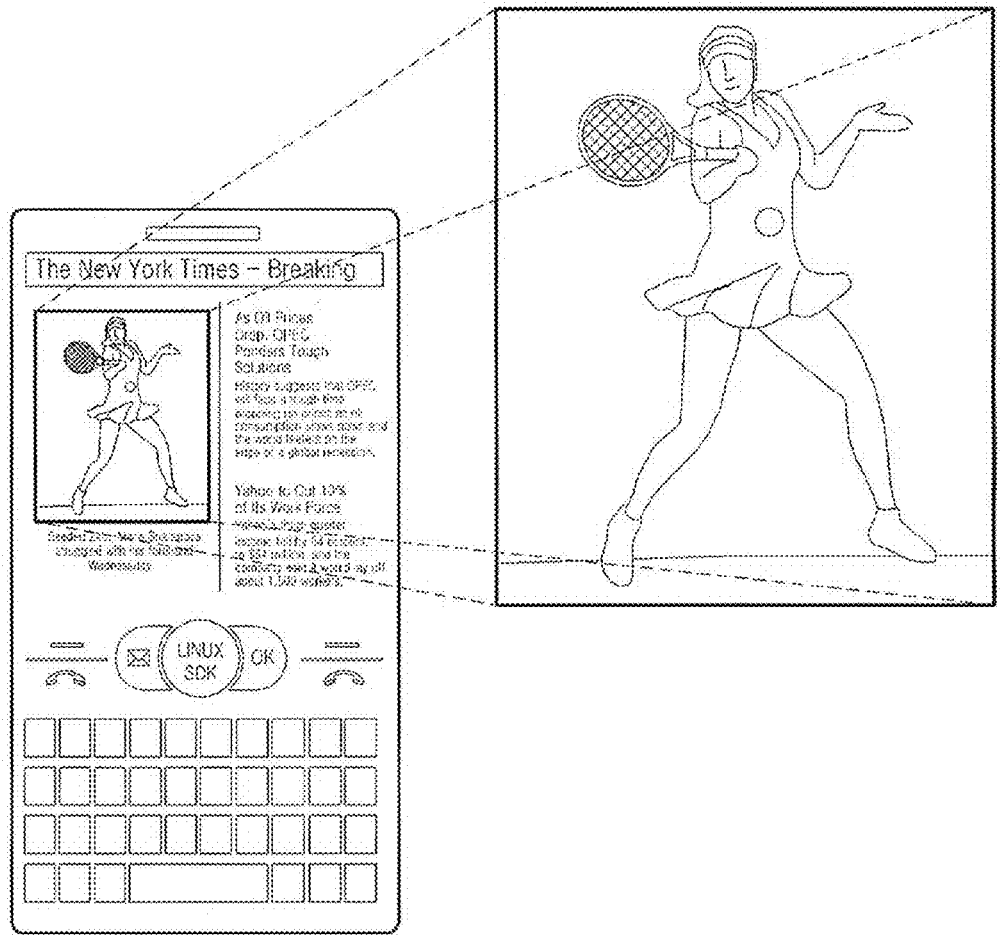

When no active context exists in the selected area, the mobile communication terminal generates a snapshot image for the selected area since the selected area is only enlarged in step 330. When the HTML document or the snapshot image for the selected area is generated, the mobile communication terminal proceeds to step 350 to generate a highest-level window layer, that is, a new window layer. After generating the new window layer, the mobile communication terminal performs an operation for rendering the selected area so that the generated HTML document or the generated snapshot image is displayed on the new window layer in step 360. When the active context exists in the selected area, an enlarged area where a link can be clicked as illustrated in FIG. 4B is displayed. For example, when no active context exists in the area selected by the user on the web content screen as illustrated in FIG. 5A, a snapshot image for a text area is generated and an enlarged area is displayed as illustrated in FIG. 5B. When an image, a link, and text are included in the selected area, all the image, link, and text are enlarged and displayed at a predefined ratio as illustrated in FIG. 5C. Here, when the selected area is enlarged, dynamic visual effect can be provided as if the selected area moves ahead from the entire screen with a spatial sense.

The user can select a link within the enlarged area and move to an upper/lower/left/right area through scrolling. When a link is clicked within an enlarged area 430 of FIG. 4B, the entire screen is changed to a linked web page screen. System load can be reduced since only the selected area is rendered to be enlarged as described above, and web navigation is also possible since the enlarged area can be viewed while looking at the entire screen.

According to the present invention, an erroneous operation due to selection in a small area can be reduced by predefining selectable areas of web content, thereby increasing the accuracy of selection. As compared to a technology for enlarging the entire screen, the present invention can render an enlarged area using only system resources of 10~20% since only a specific area is enlarged, thereby improving performance. The present invention has an advantage in that a user can perform web navigation while identifying a position of a portion currently being viewed on the entire screen area by setting the entire screen to a background and overlapping and displaying the enlarged area on the entire screen.

As compared to use of the Internet in a desktop computer, the present invention can provide a user with a three-dimensional dynamic view since a background is changed with a spatial sense while a specific area is enlarged. The present invention provides the user with new sensibility and enjoyment. The user can use web navigation in a three-dimensional space, not two-dimensional web surfing, as if a selected area moves ahead or behind on the two-dimensional screen.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for displaying web content on a mobile communication terminal having a touch screen, comprising:
   receiving a touch input on a web content screen:
   selecting an area to be enlarged according to a position where the touch input is received;
   determining an enlargement scheme for the selected area; and
   enlarging and displaying the selected area at apredefined ratio on the web content screen by overlapping the selected area on the web content screen on the basis of the set scheme,
   wherein determining the enlargement scheme includes determining whether active context exists within the selected area, and
   wherein enlarging and displaying the selected area includes:
   creating a HyperText Markup Language (HTML) document for the selected area when the active context exists;
   generating a new window layer on the web content screen; and
   rendering the created HTML document on the generated window layer.

2. The method of claim 1, wherein selecting the area to be enlarged is based on a tag unit in a HyperText Markup Language (HTML) document for the web content screen.

3. The method of claim 1, wherein the web content screen is divided into one or more areas selectable by a user.

4. The method of claim 3, wherein the selected area includes one of a position where the touch input is generated or a position closest to the position where the touch input is generated among the areas.

5. A method for displaying web content on a mobile communication terminal having a touch screen, comprising:
   receiving a touch input on a web content screen:
   selecting an area to be enlarged according to a position where the touch input is received;
   determining an enlargement scheme for the selected area: and
   enlarging and displaying the selected area at a predefined ratio on the web content screen by overlapping the selected area on the web content screen on the basis of the set scheme,
   wherein determining the enlargement scheme includes determining whether active context exists within the selected area, and
   wherein enlarging and displaying the selected area includes:
   generating a snapshot image for the selected area when no active context exists;
   generating a new window layer on the web content screen; and
   rendering the generated snapshot image on the generated window layer.

6. The method of claim 5, wherein determining the enlargement scheme includes determining whether active context exists within the selected area.

7. The method of claim 5, wherein selecting the area to be enlarged is based on a tag unit in a HyperText Markup Language (HTML) document for the web content screen.

8. The method of claim 5, wherein the web content screen is divided into one or more areas selectable by a user.

9. The method of claim 8, wherein the selected area includes one of a position where the touch input is generated or a position closest to the position where the touch input is generated among the areas.

10. A mobile communication terminal having a touch screen for displaying web contents, comprising:
   a mobile browser engine for controlling an operation for selecting an area to be enlarged according to a position where a touch input on a web content screen is received, determining an enlargement scheme for the selected area, and enlarging and displaying the selected area at a predefined ratio on the web content screen by overlapping the selected area on the web content screen on the basis of the determined scheme: and
   a display for enlarging and displaying the selected area,
   wherein the mobile browser engine determines whether active context exists within the selected area, creates a HyperText Markup Language (HTML) document for the selected area when the active context exists, generates a new window layer on the web content screen, and renders the created HTML document on the generated window layer to enlarge and display the selected area.

11. The mobile communication terminal of claim 10, wherein the area to be enlarged is selected on the basis of a tag unit in a HyperText Markup Language (HTML) document for the web content screen.

12. A mobile communication terminal having a touch screen for displaying web contents, comprising:
   a mobile browser engine for controlling an operation for selecting an area to be enlarged according to a position where a touch input on a web content screen is received, determining an enlargement scheme for the selected area, and enlarging and displaying the selected area at a predefined ratio on the web content screen by overlapping the selected area on the web content screen on the basis of the determined scheme: and
   a display for enlarging and displaying the selected area,
   wherein the mobile browser engine determines whether active context exists within the selected area, generates a snapshot image for the selected area when no active context exists, generates a new window layer on the web content screen, and renders the generated snapshot image on the generated window layer to enlarge and display the selected area.

13. The mobile communication terminal of claim 12, wherein the area to be enlarged is selected on the basis of a tag unit in a HyperText Markup Language (HTML) document for the web content screen.

14. A method for displaying web content on a mobile communication terminal having a touch screen, comprising:
   receiving a touch input on a web content screen;
   selecting an area to be enlarged according to a position where the touch input is received;
   determining whether active context for inducing a user's interaction is included in the selected area; and
   enlarging and displaying the selected area at a predefined ratio on the web content screen by overlapping the selected area on the web content screen so that the user can view a linked web page by clicking the active context in the enlarged selected area when the active context is included in the selected area, and
   wherein enlarging and displaying the selected area includes:
   creating a HyperText Markup Language (HTML) document for the selected area when the active context exists:
   generating a new window layer on the web content screen; and
   rendering the created HTML document on the generated window layer.

15. A mobile communication terminal having a touch screen for displaying web contents, comprising:
   a mobile browser engine for controlling an operation for selecting an area to be enlarged according to a position where a touch input on a web content screen is received, determining whether active context for inducing a user's interaction is included in the selected area, and enlarging and displaying the selected area at a predefined ratio by overlapping the selected area on the web content screen so that the user can view a linked web page by clicking the active context in the enlarged selected area when the active context is included in the selected area; and
   a display for displaying the selected area
   wherein enlarging and displaying the selected area includes:
   creating a HyperText Markup Language (HTML) document for the selected area when the active context exists;
   generating a new window layer on the web content screen: and
   rendering the created LITML document on the generated window layer.

16. A mobile communication terminal having a touch screen for displaying web contents, comprising:
   a mobile browser engine for controlling an operation for selecting an area to be enlarged according to a position where a touch input on a web content is received, determining an enlargement scheme for the selected area, and enlarging and displaying the selected area at a predefined ratio by overlapping the selected area on the web content screen on the basis of the determined enlargement scheme; and a display for displaying the selected area,
wherein determining the enlargement scheme includes determining whether active context exists within the selected area, and
wherein enlarging and displaying the selected area includes:
creating a HyperText Markup Language (HTML) document for the selected area when the active context exists;
generating a new window layer on the web content screen; and
rendering the created HTML document on the generated window laver.

17. A method for displaying web content on a mobile communication terminal having a touch screen, comprising:
receiving a touch input on a web content screen;
selecting an area to be enlarged according to a position where the touch input is received;
determining whether active context for inducing a user's interaction is included in the selected area; and
enlarging and displaying the selected area at a predefined ratio on the web content screen by overlapping the selected area on the web content screen so that the user can view a linked web page by clicking the active context in the enlarged selected area when the active context is included in the selected area,
wherein enlarging and displaying the selected area includes:
generating a snapshot image for the selected area when no active context exists;
generating a new window layer on the web content screen; and
rendering the generated snapshot image on the generated window layer.

18. A mobile communication terminal having a touch screen for displaying web contents, comprising:
a mobile browser engine for controlling an operation for selecting an area to be enlarged according to a position where a touch input on a web content screen is received, determining whether active context for inducing a user's interaction is included in the selected area, and enlarging and displaying the selected area at a predefined ratio by overlapping the selected area on the web content screen so that the user can view a linked web page by clicking the active context in the enlarged selected area when the active context is included in the selected area; and
a display for displaying the selected area,
wherein the mobile browser engine determines whether active context exists within the selected area, generates a snapshot image for the selected area when no active context exists, generates a new window layer on the web content screen, and renders the generated snapshot image on the generated window layer to enlarge and display the selected area.

19. A mobile communication terminal having a touch screen for displaying web contents, comprising:
a mobile browser engine for controlling an operation for selecting an area to be enlarged according to a position where a touch input on a web content is received, determining an enlargement scheme for the selected area, and enlarging and displaying the selected area at a predefined ratio by overlapping the selected area on the web content screen on the basis of the determined enlargement scheme; and
a display for displaying the selected area,
wherein determining the enlargement scheme includes determining whether active context exists within the selected area, and
wherein the mobile browser engine further generates a snapshot image for the selected area when no active context exists, generates a new window layer on the web content screen, and renders the generated snapshot image on the generated window layer to enlarge and display the selected area.

* * * * *